(12) United States Patent
Xu

(10) Patent No.: US 11,841,146 B2
(45) Date of Patent: Dec. 12, 2023

(54) MULTIFUNCTIONAL APPLIANCE FOR COOKING

(71) Applicant: Rimoo (Foshan) Electrical Appliance Tech Co., Ltd., Foshan (CN)

(72) Inventor: Shijie Xu, Foshan (CN)

(73) Assignee: Rimoo (Foshan) Electrical Appliance Tech Co., Ltd., Foshan (CN)

( * ) Notice: Subject to any disclaimer, the term of this patent is extended or adjusted under 35 U.S.C. 154(b) by 250 days.

(21) Appl. No.: 16/939,942

(22) Filed: Jul. 27, 2020

(65) Prior Publication Data
US 2021/0388991 A1 Dec. 16, 2021

(30) Foreign Application Priority Data

Dec. 17, 2019 (CN) .......................... 201911304279.1

(51) Int. Cl.
| | | |
|---|---|---|
| *F24C 7/08* | (2006.01) | |
| *A47J 27/00* | (2006.01) | |
| *A47J 27/08* | (2006.01) | |
| *A47J 27/082* | (2006.01) | |
| *A47J 27/086* | (2006.01) | |

(Continued)

(52) U.S. Cl.
CPC ............. *F24C 7/087* (2013.01); *A47J 27/004* (2013.01); *A47J 27/0802* (2013.01); *A47J 27/082* (2013.01); *A47J 27/086* (2013.01); *A47J 36/20* (2013.01); *A47J 36/32* (2013.01);

(Continued)

(58) Field of Classification Search
None
See application file for complete search history.

(56) References Cited

U.S. PATENT DOCUMENTS

| | | | | |
|---|---|---|---|---|
| 9,615,694 | B2 * | 4/2017 | Yoshidome | ............. A47J 37/10 |
| 2019/0045973 | A1 * | 2/2019 | Gill et al. | ............... A47J 37/06 |

FOREIGN PATENT DOCUMENTS

| | | | | |
|---|---|---|---|---|
| CN | 1964653 | B1 * | 11/2010 | .......... A47J 37/0623 |
| CN | 202981682 | U * | 6/2013 | .......... A47J 37/0641 |

(Continued)

OTHER PUBLICATIONS

Machine translation of CN 105996809 A1 performed on Jul. 21, 2022, Luo (Year: 2016).*

(Continued)

*Primary Examiner* — Brian W Jennison
*Assistant Examiner* — Kevin Guanhua Wen
(74) *Attorney, Agent, or Firm* — Dragon Sun Law Firm, PC; Nathaniel Perkins

(57) ABSTRACT

The present disclosure relates to a multifunctional appliance for cooking comprising: a cover; a first pot on which the cover is fitted, the first pot being provided with one or more first girds at a predetermined position thereof; a second pot detachably fixed inside the first pot, the second pot being provided with one or more second grids at a predetermined position thereof, the position of the one or more second grids corresponding with the position of the one or more first grids; a first heating member fixed on a sidewall of the first pot, facing right toward the one or more first girds; and a convection member fixed on the sidewall of the first pot, facing right toward the first heating member, such that the airflow generated by the convection member flows into the second pot through the first girds and second grids after being heated.

10 Claims, 12 Drawing Sheets

(51) Int. Cl.
*A47J 36/20* (2006.01)
*A47J 36/32* (2006.01)
*A47J 37/06* (2006.01)
*F24C 7/06* (2006.01)
*F24C 15/16* (2006.01)
*F24C 15/32* (2006.01)

(52) U.S. Cl.
CPC ........... *A47J 37/0641* (2013.01); *F24C 7/067* (2013.01); *F24C 15/16* (2013.01); *F24C 15/325* (2013.01)

(56) References Cited

FOREIGN PATENT DOCUMENTS

| CN | 204192406 U | * | 3/2015 | .......... A47J 37/0641 |
| CN | 105996809 A1 | * | 10/2016 | .......... A47J 37/0664 |
| CN | 208404220 U1 | * | 1/2019 | .............. A47J 37/06 |
| CN | 110623535 A1 | * | 12/2019 | .............. A47J 36/38 |
| CN | 110786733 A1 | * | 2/2020 | .......... A47J 37/0629 |
| KR | 20090097048 A1 | * | 9/2009 | ............. A47J 27/086 |
| WO | WO 2019237653 A1 | * | 12/2019 | ............. A47J 27/086 |

OTHER PUBLICATIONS

Machine translation of CN 208404220 U1 performed on Jul. 21, 2022, Huang (Year: 2019).*
Machine translation of CN 1964653 B1 performed on Jul. 21, 2022, Payen et al. (Year: 2010).*
Machine translation of CN 110786733 A1 performed on Jul. 22, 2022, Wang et al. (Year: 2020).*
Machine translation of CN 110623535 A1 performed on Jul. 22, 2022, Ma (Year: 2019).*
Machine translation of WO 2019237653 A1 performed on Jul. 22, 2022, Zhenxiong et al. (Year: 2019).*
Machine translation of CN 204192406 U performed on Jul. 22, 2022, Liang et al. (Year: 2015).*
Machine translation of KR 20090097048 A1 performed on Dec. 29, 2022, Son et al. (Year: 2009).*
Machine translation of CN 202981682 U performed on Dec. 29, 2022, Shangguan (Year: 2013).*

* cited by examiner

MULTIFUNCTIONAL APPLIANCE FOR COOKING

CROSS-REFERENCE TO RELATED PATENT APPLICATION

This application claims priority to and the benefit of 2019113042791, filed Dec. 17, 2019, entitled "MULTIFUNCTIONAL APPLIANCE FOR COOKING," by SHIJIE X U et al. The entire disclosure of the above-identified application is incorporated herein by reference.

FIELD

The present disclosure relates to the technical field of machinery, and more particularly, to a multifunctional appliance for cooking.

BACKGROUND

With the improvement of people's life qualities, kitchen electrical appliances, such as various types of pots, ovens, and air fryers, are becoming more and more popular.

However, the conventional pots, ovens and air fryers are configured to heat food from the bottom or the top thereof, especially for the ovens and the air fryers. As a result, the food is stacked at the bottom of the appliance and due to poor air convection, and the food is likely to be unevenly heated.

Therefore, a heretofore unaddressed need exists in the art to address the aforementioned deficiencies and inadequacies.

SUMMARY

In order to solve the above problem, it is necessary to provide a multifunctional appliance for cooking which is able to heat food evenly.

A multifunctional appliance for cooking includes:
a cover;
a first pot on which the cover is fitted, the first pot being provided with one or more first grids at a predetermined position thereof;
a second pot detachably fixed inside the first pot, the second pot being provided with one or more second grids at a predetermined position thereof, the position of the one or more second grids corresponding with the position of the one or more first grids;
a first heating member fixed on a sidewall of the first pot, facing right toward the one or more first grids; and
a convection member fixed on the sidewall of the first pot, facing right toward the first heating member, such that the airflow generated by the convection member flows into the second pot through the one or more first grids and second grids after heated by the first heating member, so as to heat the food inside the second pot.

In another embodiment of the present disclosure, the appliance further comprises:
a second heating member provided at a bottom of the first pot, the second heating member being configured to heat a bottom of the second pot disposed inside the first pot.

In an embodiment of the present disclosure, the convection member comprises:
a support frame fixed to the sidewall of the first pot;
a fan motor fixed to a side of the support frame away from the sidewall of the first pot; and
one or more blades fixed to a side of the support frame near the sidewall of the first pot, the one or more blades being coupled with the fan motor, the fan motor being configured to drive the one or more blades.

In another embodiment of the present disclosure, the one or more second grids are arranged evenly or unevenly on the entire sidewall of the second pot, or the one or more second grids are arranged evenly or unevenly on a portion of the sidewall of the second pot.

In another embodiment of the present disclosure, the height of the second pot is lower than the height of the first pot, such that a clearance is formed between the second pot and the cover when the cover is fitted onto the first pot.

In another embodiment of the present disclosure, the appliance further comprises:
a rotary motor provided at the bottom of the first pot and coupled with a rotating shaft, the rotary motor being configured to drive the rotating shaft to rotate, wherein the second pot is further provided with a first motor base at the bottom thereof, when the second pot is disposed inside the first pot, the rotating shaft is engaged with the first motor base and is driven by the rotary motor to rotate, which causes the rotation of the second pot via the first motor base.

In another embodiment of the present disclosure, the second heating member is a heating plate provided with a motor mounting hole at a center thereof, and wherein the heating plate is fixed at the bottom of the first pot, and wherein the rotary motor is fixed at the bottom of the first pot through the motor mounting hole.

In another embodiment of the present disclosure, the height of the rotating shaft is equal to or lower than the height of the heating plate, and wherein the first motor base is configured to protrude from the bottom of the second pot, and wherein when the second pot is fixed inside the first pot, the first motor base inserts into the motor mounting hole and engages with the rotating shaft.

In another embodiment of the present disclosure, the height of the rotating shaft is greater than the height of the heating plate, and wherein the first motor base is configured to recess into the bottom of the second pot, and wherein when the second pot is fixed inside the first pot, the rotating shaft inserts into the first motor base and engage with the first motor base.

In another embodiment of the present disclosure, the appliance further comprises:
a third pot detachably fixed inside the first pot, the third pot being in contact with the second heating member so as to be heated by the second heating member, wherein when the cover is fitted onto the first pot, the third pot and the cover form a sealed space.

In another embodiment of the present disclosure, the cover is further provided with an air hole configured to open when the air pressure in the sealed space formed by the third pot and the cover is greater than a preset value.

In another embodiment of the present disclosure, the appliance further comprises:
a controller provided on the sidewall of the first pot and coupled with the first heating member, the controller being configured to control the operation of the first heating member.

In another embodiment of the present disclosure, the appliance further comprises a second heating member, and wherein the controller is coupled with the second heating member, and is configured to control the operation of the second heating member and wherein when the second pot is mounted inside the first pot, the controller is configured to control the first heating member and the second heating member to operate, and when the third pot is mounted inside the first pot, the controller is configured to control the second heating member to operate and controls the first heating member not to operate.

In another embodiment of the present disclosure, the controller is further coupled with a fan motor and is configured to control the operation of the fan motor, and wherein when the second pot is mounted inside the first pot, the controller is configured to control the fan motor to operate.

In another embodiment of the present disclosure, the controller is further coupled with a rotary motor, and wherein when the second pot is fixed inside the first pot, the controller is configured to control the rotary motor to operate, and when the third pot is fixed inside the first pot, the controller is configured to control the rotary motor not to operate.

According to the multifunctional appliance for cooking described above, the first pot is provided with one or more first grids in a predetermined position, and the second pot is provided with one or more second grids in a corresponding predetermined position on a sidewall thereof. In this way, the one or more first grids and second grids face toward each other, the convection of the air inside the second pot can therefore be realized through the convention member. Further, the convection member faces right toward the first heating member, such that the air generated by convection can be heated, and the heated air can then flow into the second pot through the one or more first grids and second grids, and flow through the food in the second pot to heat the food evenly. Since the air flowing into the second pot has been heated, the air in contact with the food has been heated, and the food can be heated evenly.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of another embodiment.

DETAILED DESCRIPTION

Figure 1:
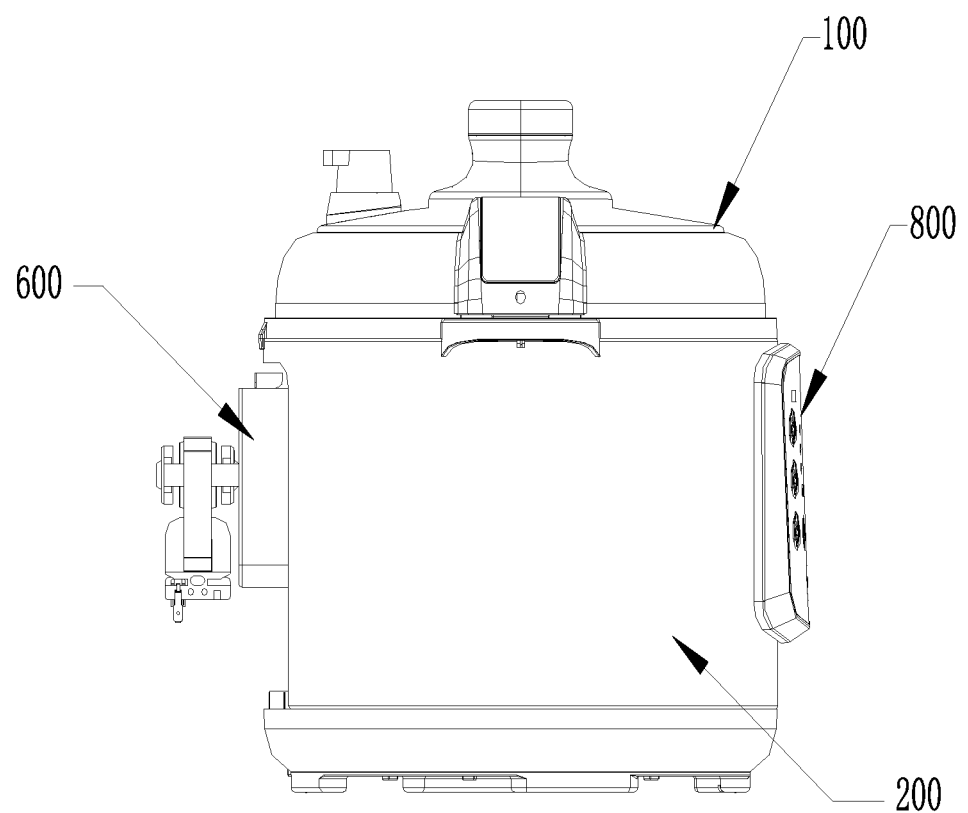
FIG. 1 is a schematic view of a multifunctional appliance for cooking according to the present disclosure.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The objects, technical solutions and advantages of the present disclosure will become more apparent from the following detailed description of the drawings and embodiments of the present disclosure. It should be understood that the specific embodiments described herein only intend to explain the present disclosure, without limiting it.

Figure 2:
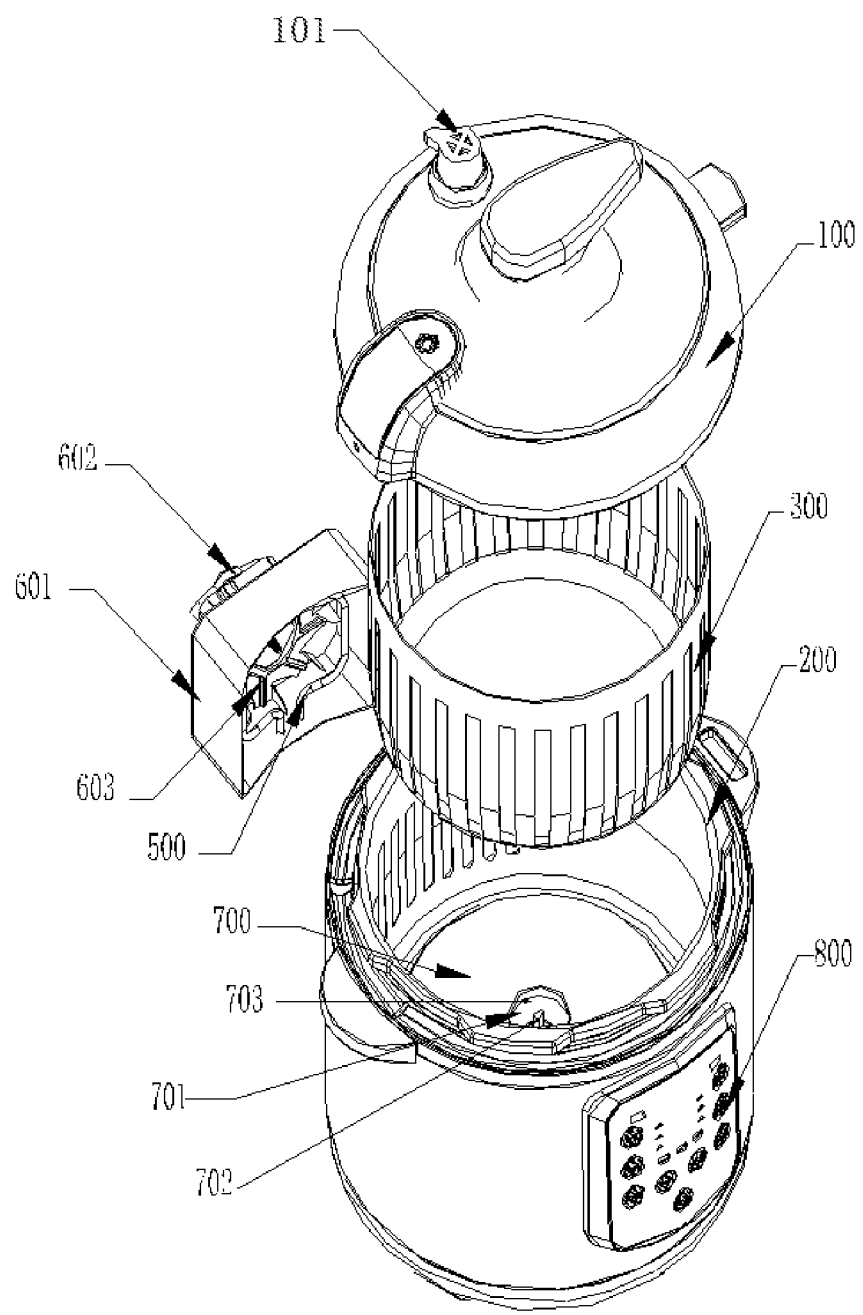
FIG. 2 is an exploded schematic view of the multifunctional appliance in a baking mode according to the present disclosure.

Specifically, as shown in FIG. 1 to FIG. 12, the present disclosure provides a multifunctional appliance based on sidewall-heating. The appliance may include a cover 100, a first pot 200, a second pot 300, a first heating member 500 and a convection member 600. Specifically, as shown in FIG. 1 and FIG. 2, the cover 100 may be detachably fitted onto the first pot 200. The cover 100 may be removed when there is a need to replace the pot inside the first pot 200, or to take out the food from or add food into the pot inside the first pot 200. When the appliance is in operation, such as heating, the cover 100 is fixed onto the first pot 200 to ensure normal operation of the appliance.

Figure 3:
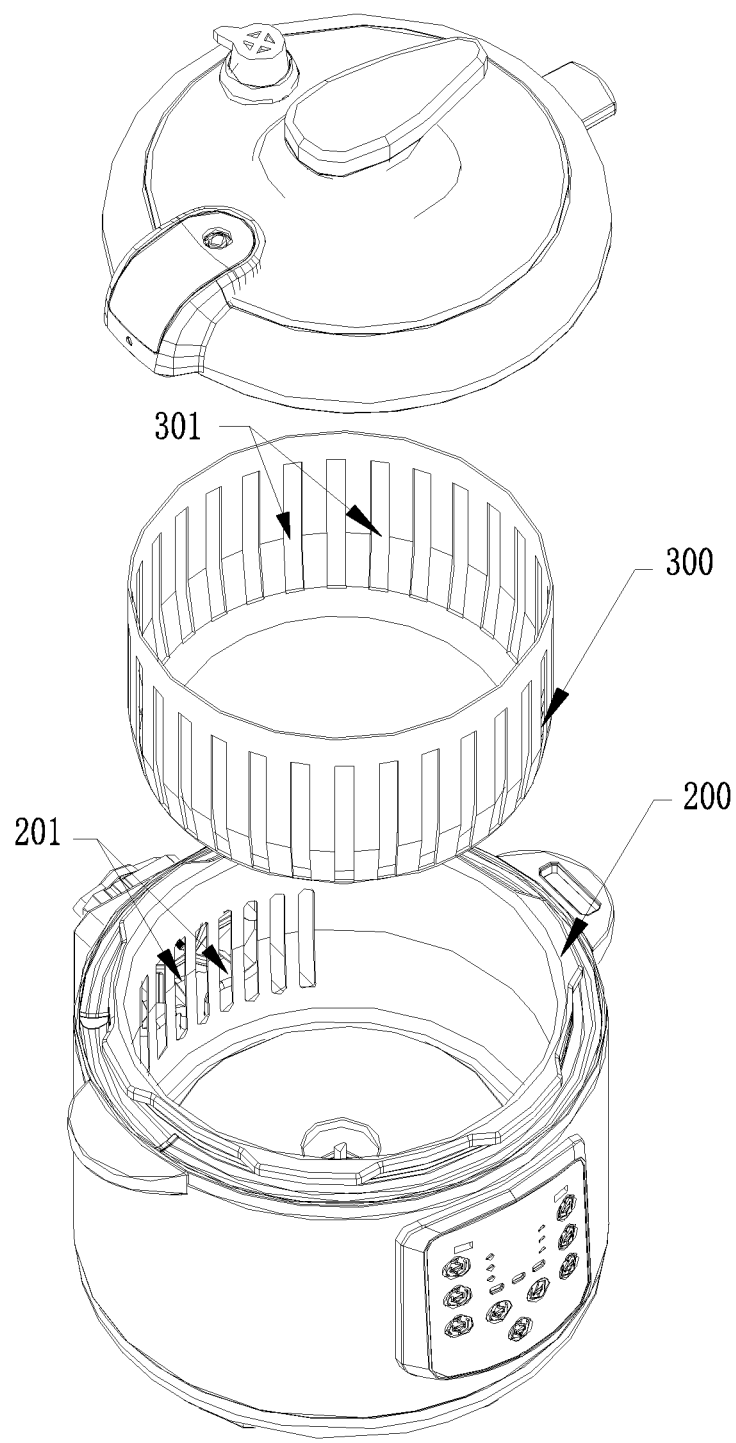
FIG. 3 is a schematic view of a first pot and a second pot according to another embodiment of the present disclosure.
Figure 4:
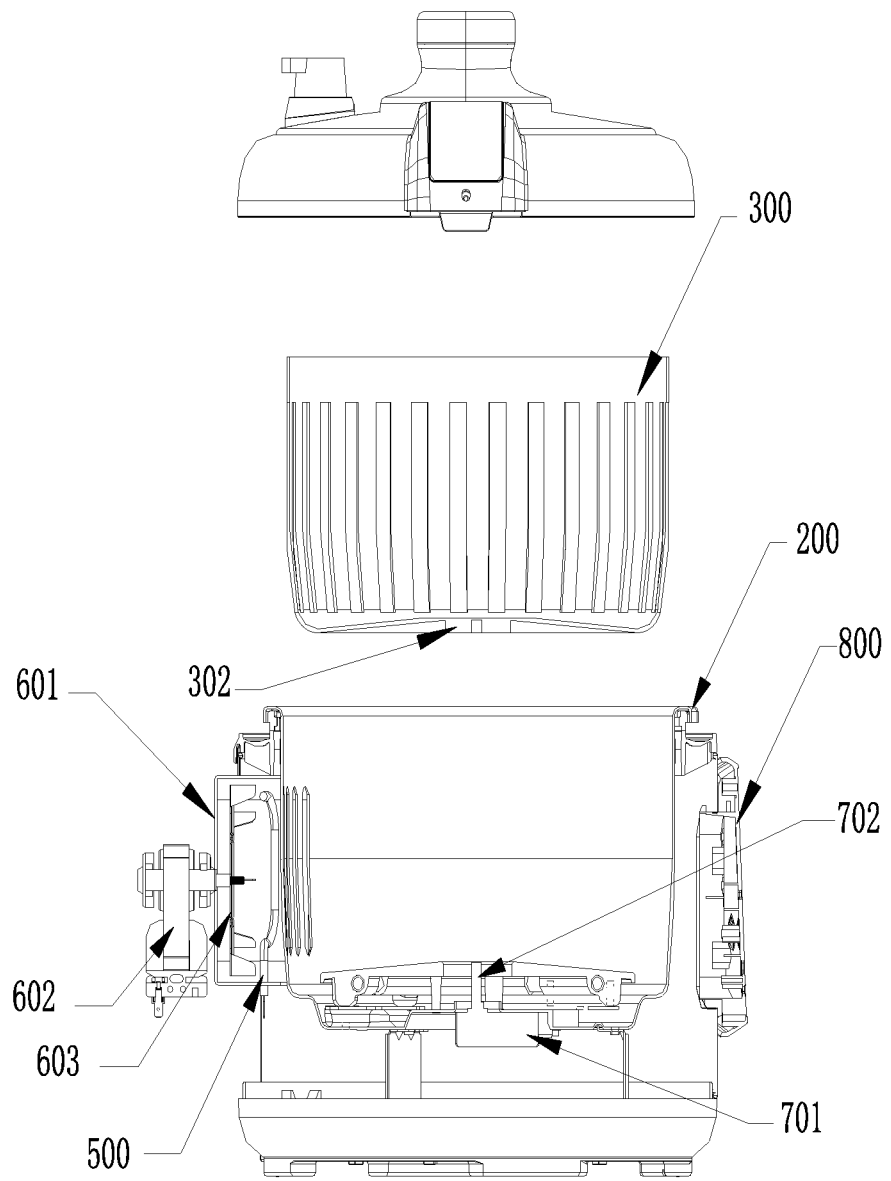
FIG. 4 is a cross-sectional view of the multifunctional appliance according to another embodiment of the present disclosure wherein the second pot is not put into the first pot.
Figure 5:
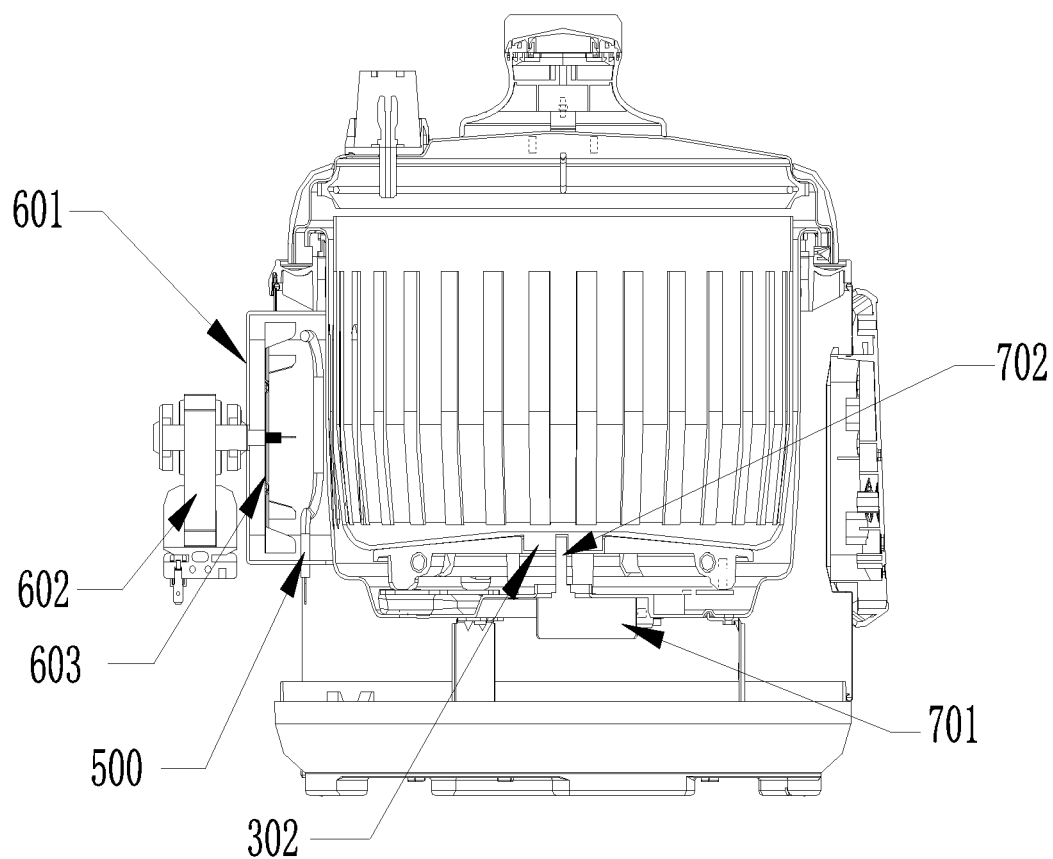
FIG. 5 is a cross-sectional view of the multifunctional appliance according to another embodiment of the present disclosure wherein the second pot is put into the first pot.
Figure 6:
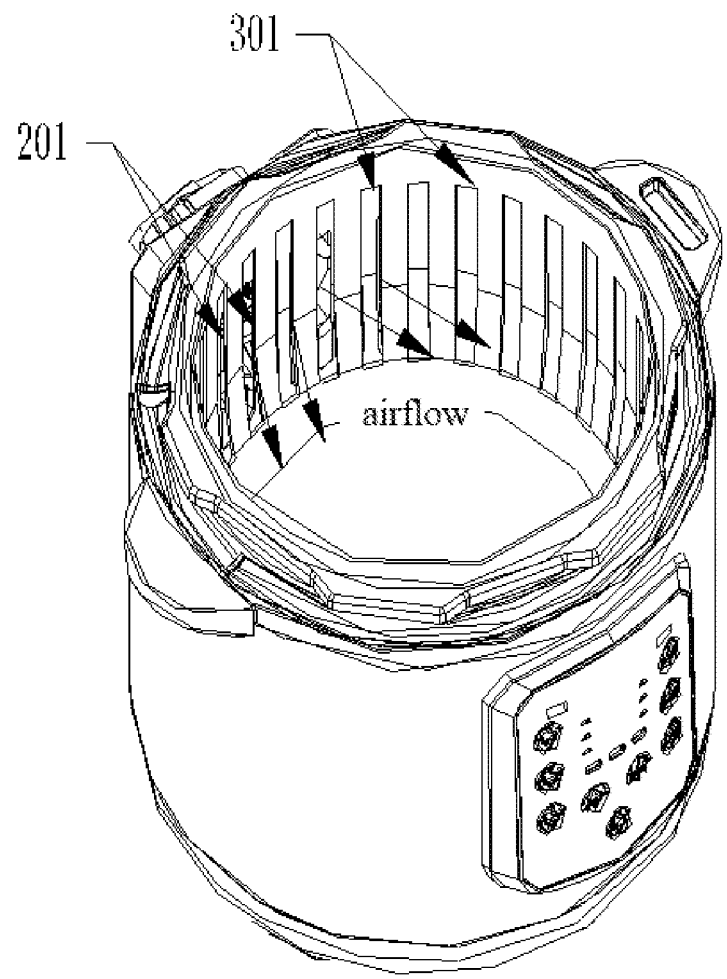
FIG. 6 is a schematic view showing the airflow during baking according to another embodiment of the present disclosure.

In another embodiment of the present disclosure, as shown in FIG. 3 to FIG. 5, the first pot 200 is also provided with a first heating member 500 on a sidewall thereof. The first heating member 500 is configured to heat the second pot 300 disposed inside the first pot 200 during operation, so as to heat the food in the second pot 300. Specifically, in order to allow the food in the second pot 300 to be heated evenly, the air flowing into the second pot 300 must be heated evenly. In the present disclosure, the first pot 200 is provide with one or more first grids 201 in a predetermined position thereof, for example, in a position corresponding to the first heating member 500. Optionally, the first heating member 500 faces right toward the one or more first grids 201, and the second pot 300 is provided with one or more second grids 301 in a predetermined position thereof corresponding to the predetermined position of the first pot 200. In this way, the one or more first grids 201 and second grids 301 face toward each other, such that the air may flow into the second pot 300 through the one or more first grids 201 and second grids 301 after being heated by the first heating member 500, to heat the food in the second pot 300.

Further, in order to encourage the air to flow into the second pot 300, the appliance of the present disclosure is also provided with a convection member 600. The convection member 600 may be fixed to the sidewall of the first pot 200 and face right toward the first heating member 500, such that the airflow generated by the convection member 600 may flow into the second pot 300 through the one or more first grids 201 and second grids 301 after being heated by the first heating member 500, to heat the food in the second pot 300.

In another embodiment of the present disclosure, the first heating member 500 described above may be a heating tube, and both ends of the heating tube may be connected to the boundary of the one or more first grids 201 respectively. The first heating member 500 may include a plurality of heating tubes. Alternatively, the first heating member 500 may be a spirally shaped heating member, and the entire dimension of the spirally shaped heating member after being spiraled may correspond with the dimension of the one or more first grids 201. The convection member 600 may be configured to cover the first heating member 500 and make air flow toward the first heating member 500, such that the air flowing into the first heating member 500 may be heated therein and flows into the second pot 300 through the one or more first grids 201 and second grids 301, to heat the food in the second pot 300. In this way, the air flowing into the second pot 300 has been heated, which ensures that the air inside the second pot 300 can be heated evenly, and thereby allows the food in the second pot 300 to be heated evenly. The first heating member 500 and the convection member 600 described above may be provided on an outer sidewall of the first pot 200.

According to the multifunctional appliance for cooking described above, the first pot 200 is provided with one or more first grids 201 in a predetermined position, and the second pot 300 is provided with one or more second grids 301 in a corresponding predetermined position on a sidewall thereof. In this way, the one or more first grids 201 and second grids 301 face toward each other, and the convection of the air inside the second pot 300 may therefore be realized through the convention member 600. Further, the convection member 600 faces right toward the first heating member 500, such that the air generated by convection can be heated, and the heated air may then flow into the second pot 300 through the one or more first grids 201 and second grids 301, and flow through the food in the second pot 300 to heat the food evenly. Since the air flowing into the second pot 300 has been heated, the air in contact with the food has been heated, and the food can be heated evenly.

In another embodiment of the present disclosure, the multifunctional appliance may further include a second heating member 700. The second heating member 700 may be provided at the bottom of the first pot 200, and is configured to heat the bottom of the second pot 300 disposed inside the first pot 200.

The second heating member 700 is provided at the bottom of the first pot 200, such that the bottom of the second pot 300 disposed inside the first pot 200 can also be heated by the second heating member 700. With the cooperation of the first heating member 500 provided on the sidewall of the first pot 200, both the sidewall and the bottom of the second pot 300 can be heated at the same time, which forms a stereo baking pattern so as to heat the food quickly and evenly.

Specifically, when the second pot 300 is disposed inside the first pot 200 and the cover 100 is fitted onto the first pot 200, the first heating member 500 and the second heating member 700 may be controlled to heat at the same time. The air drawn in by the convection member 600 may be heated by the first heating member 500, and the heated air may then flow into the second pot 300 through the one or more first grids 201 and second grids 301, while the bottom of the second pot 300 may be heated by the second heating member 700 such that the food in the second pot 300 can be heated from the bottom thereof. In this way, a stereo baking pattern may be formed so as to heat the food quickly and evenly.

In another embodiment of the present disclosure, the present appliance may further include a rotary motor 701 provided at the bottom of the first pot 200. The rotary motor 701 may be coupled with a rotating shaft 702, and may be configured to drive the rotating shaft 702 to rotate. The second pot 300 may be also provided with a first motor base 302 at the bottom thereof. When the second pot 300 is disposed inside the first pot 200, the rotating shaft 702 may be engaged with the first motor base 302 and may be driven to rotate by the rotary motor 701, and then cause the rotation of the second pot 300 via the first motor base 302.

Optionally, the second heating member 700 may be a heating plate provided with a motor mounting hole 703 at the center thereof. The heating plate may be fixed at the bottom of the first pot 200, and the rotary motor 701 may be fixed at the bottom of the first pot 200 through the motor mounting hole 703.

As shown in the drawings, the second heating member 700 may be a heating plate provided with a motor mounting hole 703 at the center thereof. For example, the heating plate may be annular. In another embodiment, the heating plate may have an irregular shape with a square outer edge and a round inner edge. The heating plate may be fixed at the bottom of the first pot 200, and the rotary motor 701 may also be fixed at the bottom of the first pot 200 and may be mounted through the motor mounting hole 703. The motor mounting hole 703 is a hole provided at the center of the heating plate, and may be typically provided right at the center of the heating plate, so as to allow the rotation of the pot in contact with the heating plate. Optionally, the motor mounting hole 703 may be an annular track, such that the second pot 300 in contact with the heating plate may be driven to move along the track, that is to say, to rotate along the track, by one of the rotary motors 701. For example, there may be one or more rotating shafts 702 for one or more rotary motors 701 provided on the track, wherein the rotating shafts 702 may be matched with the first motor base 302 provided at the bottom of the second pot 300, and may move along the track to cause the rotation of the second pot 300.

Figure 7:
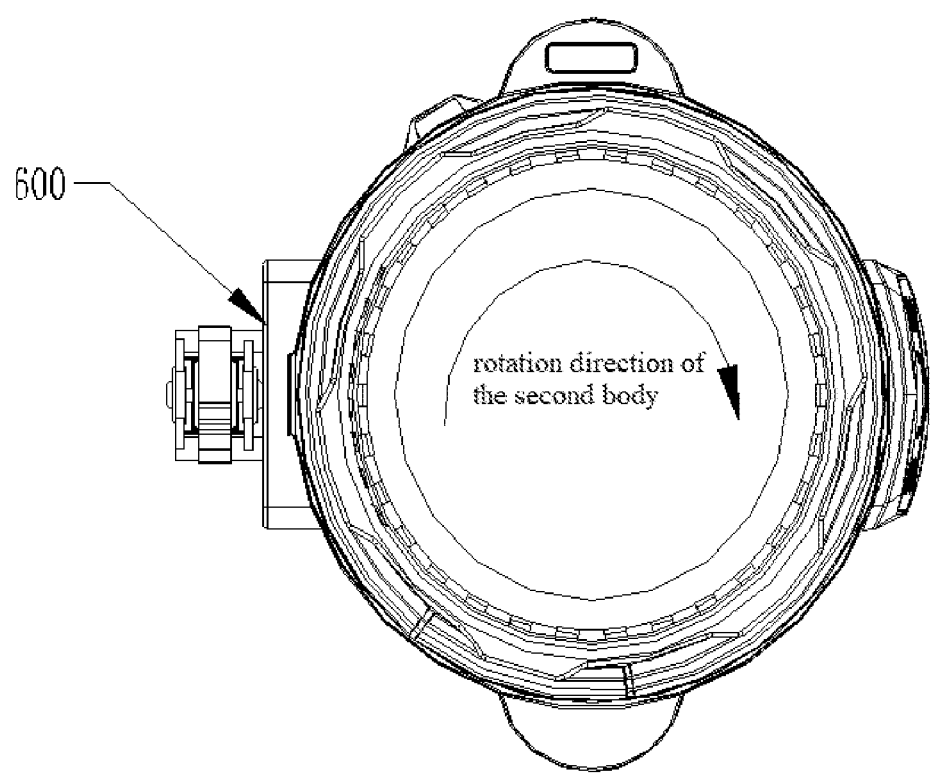
FIG. 7 is a schematic view showing the rotation direction of the second pot during baking according to another embodiment of the present disclosure.

Further, the rotating shaft 702 of the rotary motor 701 of the second heating member 700 may be coupled with the first motor base 302 provided at the bottom of the second pot 300. In this way, by driving the rotary motor 701, the rotating shaft 702 of the rotary motor 701 may be driven, therefore the first motor base 302 may be driven and cause the rotation of the second pot 300, which allows the bottom of the second pot 300 to be heated evenly. The rotation direction is shown in FIG. 7. Additionally, the sidewall of the second pot 300 is provided with one or more second grids 301, either evenly or unevenly. For example, each second grid 301 may be vertical or horizontal, and may have a shape in accordance with the shape of the first grid 201. When a plurality of second grids 301 are provided on the sidewall of the second pot 300 every predetermined distance, that is to say, a plurality of second grids 301 are provided over the entire sidewall of the second pot 300, as the rotation of the second pot 300 driven by the rotary motor 701, different second grids 301 on the second pot 300 will come to face right toward the one or more first grids 201 on the first pot 200, such that the air drawn in by the convection member 600 flows into the second pot 300 through the one or more first grids 201 and different second grids 301 to allow the entire sidewall of the second pot 300 to be heated, i.e., to be heated evenly. In addition, since the bottom of the second pot 300 can also be heated evenly during rotation by the second heating member 700 at the same time, a stereo baking pattern can be formed to heat the food evenly.

In another embodiment of the present disclosure, the height of the rotating shaft 702 may be equal to or lower than the height of the heating plate, and the first motor base 302 may be configured to protrude from the bottom of the second pot 300. When the second pot 300 is fixed inside the first pot 200, the first motor base 302 may be inserted into the motor mounting hole 703 and engage with the rotating shaft 702.

In another embodiment of the present disclosure, the height of the rotating shaft 702 may be greater than the height of the heating plate, and the first motor base 302 may be configured to recess into the bottom of the second pot 300. When the second pot 300 is fixed inside the first pot 200, the rotating shaft 702 may be inserted into the first motor base 302 and engage with the first motor base 302.

Specifically, in order to realize the rotation of the second pot 300, the first motor base 302 may be configured to protrude from or recess into the bottom of the second pot 300.

Specifically, the height of the rotating shaft 702 may be equal to or lower than the height of the heating plate, and the first motor base 302 may be configured to protrude from the bottom of the second pot 300, wherein the height of the first motor base 302 protruding from the bottom of the second pot 300 may be matched with the height of the motor mounting hole 703, such that when the second pot 300 is fixed to the first pot 200, the first motor base 302 is inserted into the motor mounting hole 703 and engage with the rotating shaft 702. In this way, when the rotating shaft 702 is driven by the rotary motor 701, the first motor base 302 may also be driven and thereby cause the rotation of the second pot 300.

Additionally, the height of the rotating shaft 702 may be greater than the height of the heating plate, and the first motor base 302 may be configured to recess into the bottom of the second pot 300. The height of the first motor base 302 recessing into the bottom of the second pot 300 may be matched with the height of the portion of the rotating shaft 702 protruding from the plane of the second heating member 700, or be matched with the height of the rotating shaft 702. When the height of the first motor base 302 recessing into the bottom of the second pot 300 is matched with the height of the portion of the rotating shaft 702 protruding from the plane of the second heating member 700, only the rotary motor 701 is mounted through the motor mounting hole 703, and the height of the rotary motor 701 is matched with the height of the motor mounting hole 703, such that the entire rotating shaft 702 is located at a higher latitude than the second heating member 700. When the height of the first motor base 302 recessing into the bottom of the second pot 300 is matched with the height of the rotating shaft 702, the rotating shaft 702 may be partially located inside the motor mounting hole 703, such that when the second pot 300 is fixed inside the first pot 200, the rotating shaft 702 is inserted into the first motor base 302 to engage with the first motor base 302. In this way, when the rotating shaft 702 is driven by the rotary motor 701, the first motor base 302 may also be driven and thereby cause the rotation of the second pot 300.

In the above embodiment, the food in the second pot 300 can be heated not only by the first heating member 500 provided on the sidewall of the first pot 200, but also by the second heating member 700 provided at the bottom of the first pot 200, such that a stereo baking pattern is formed to heat the food evenly.

In another embodiment of the present disclosure, the convection member 600 may include a support frame 601, a fan motor 602 and one or more fan blades 603. The support frame 601 is fixed to the sidewall of the first pot 200 and may be rectangular. The peripheral edge of the bottom of the support frame 601 may be directly connected to the sidewall of the first pot 200, or may be integrally formed with the first pot 200. The support frame 601 may face right toward the first heating member 500 mounted on the sidewall of the first pot 200. The fan motor 602 may be provided at the other side of the support frame 601 and may output its driving force through a shaft of the fan motor 602. The one or more fan blades 603 may be fixed to the side of the support frame 601 near the sidewall of the first pot 200 and is coupled to the shaft of the fan motor 602, such that the fan motor 602 can drive the one or more fan blades 603 to rotate to make the ambient air drawn in and heated by the first heating member 500 on the sidewall of the first 200 to obtain heated air. The heated air may then be sent into the second pot 300 through the one or more first grids 201 and second grids 301 to heat the food in the second pot 300.

In the above embodiment, the convection member 600 is formed by a support frame 601, a fan motor 602 and one or more fan blades 603, so as to make the ambient air drawn in and heated by the first heating member 500 on the sidewall of the first 200 to obtain heated air, and the heated air may then be sent into the second pot 300 through the one or more first grids 201 and second grids 301 to heat the food in the second pot 300.

In one embodiment of the present disclosure, the one or more second grids 301 may be provided on the entire sidewall of the second pot 300 evenly or unevenly, or may be provided on a portion of the sidewall of the second pot 300 evenly or unevenly.

Specifically, as shown in the drawings, the one or more first grids 201 are provided on the first pot 200. The one or more second grids 301 are provided on the second pot 300, wherein the one or more second grids 301 may be provided on only a portion of the sidewall of the second pot 300 evenly or unevenly. For the convenience in arrangement, the first pot 200 and the second pot 300 may be provided with a mark respectively, for example, the first pot 200 may be provided with a first mark, and the second pot may be provided with a second mark. The user can have the one or more second grids 301 and the one or more first grids 201 aligned with each other by having the first mark and the second mark aligned with each other, and the second pot 300 may be configured to be not rotatable in this case. If the one or more second grids 301 are provided on the entire sidewall of the second pot 300 evenly or unevenly, there is no need to provide the above described marks, and the second pot 300 may be configured to be rotatable in such a case. In this way, as the rotation of the second pot 300 driven by the rotary motor 701, different second grids 301 will come to face right toward the one or more first grids 201 on the first pot 200, such that the air drawn in by the convection member 600 may flow into the second pot 300 through the one or more first grids 201 and different second grids 301, to allow the entire sidewall of the second pot 300 to be heated, i.e., to be heated evenly. In addition, since the bottom of the second pot 300 can also be heated evenly during rotating by the second heating member 700 at the same time, a stereo baking pattern can be formed to heat the food evenly.

In the above embodiment, the one or more grids on the second pot 300 may have various forms, and no specific limitation is made here.

In another embodiment of the present disclosure, the height of the second pot may be lower than the first pot 200, such that when the cover 100 is fitted onto the first pot 200, there is a clearance 900 formed between the second pot 300 and the cover 100.

Figure 8:
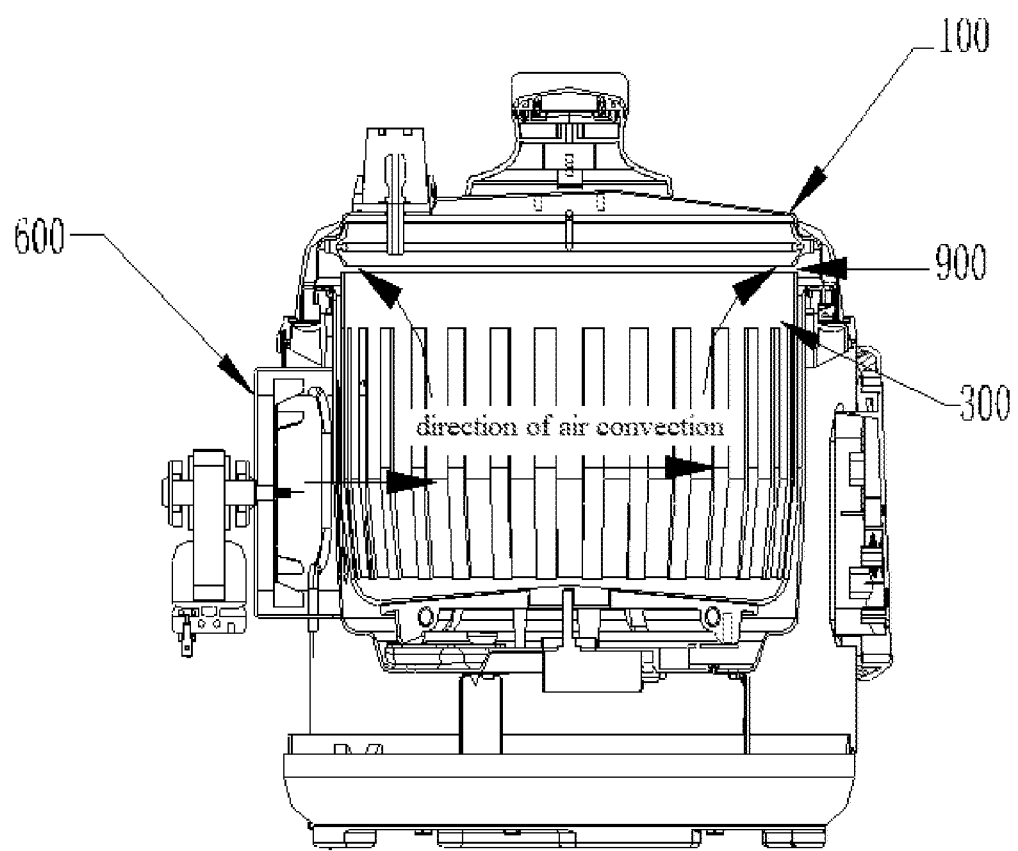
FIG. 8 is a schematic view showing the direction of the air convection during baking according to another embodiment of the present disclosure.

As shown in FIG. 8, the height of the second pot 300 allows a clearance 900 to be formed between the cover 100 and the second pot 300. The water vapor generated during baking may rise and be discharged quickly from the clearance 900 between the cover 100 and the second pot 300 with the help of the wind force generated by the convection member 600, taking away a part of water, thereby a better baking effect can be obtained. Optionally, the cover 100 may be provided with an air hole 101 to allow the water to be taken away through the air hole 101.

Specifically, due to poor air ventilation, the conventional cooking appliances, such as the pressure cooking appliances, do not have baking function at all, or have poor baking effect, while the conventional baking ovens do not have pressure cooking function. That is to say, the user has to buy separate products if pressure cooking or baking is needed, which may occupy a lot of space in the kitchen. To avoid this situation, the multifunctional appliance of the present disclosure may further comprise a third pot 400 detachably fixed inside the first pot 200, and when the cover 100 is fitted onto the first pot 200, a sealed space may be formed between the third pot 400 and the cover 100.

Figure 10:
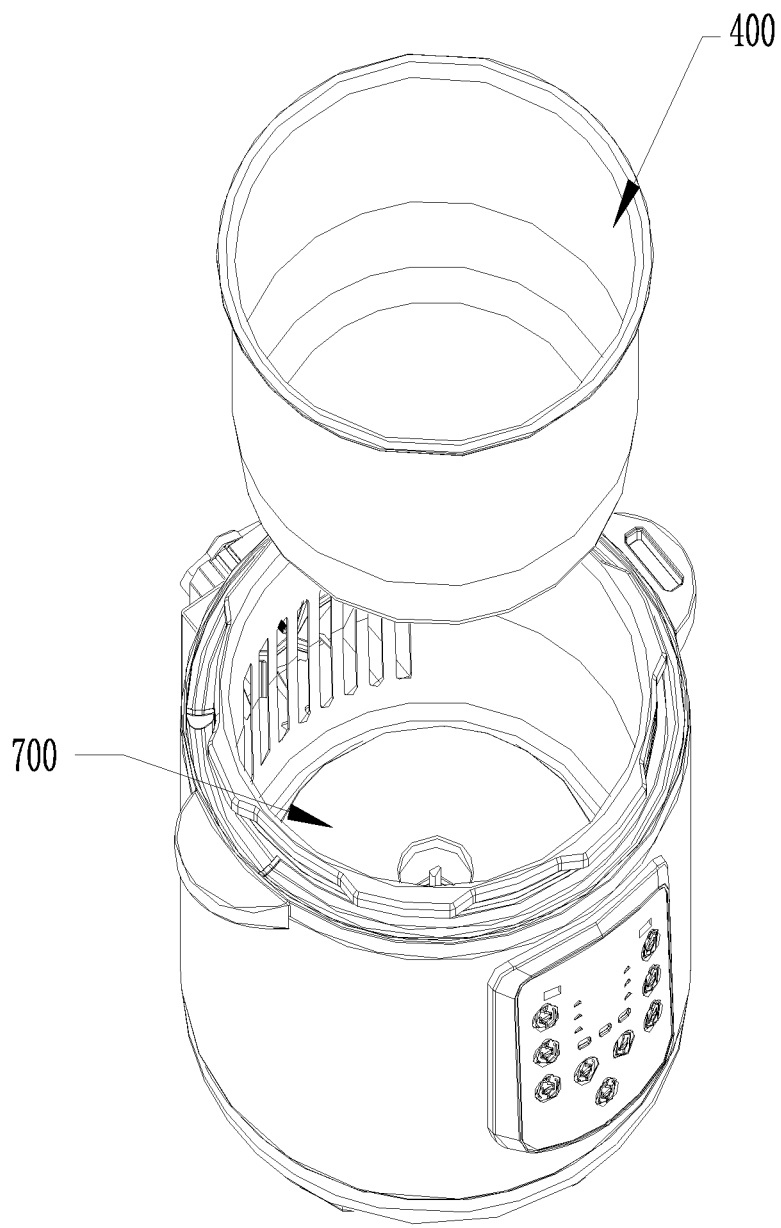
FIG. 10 is a schematic structural view of a third pot according to another embodiment of the present disclosure.

Specifically, as shown in FIG. 10, the third pot 400 may be used to conduct pressure cooking, and is not provided with any second grid 301. The height of the third pot 400 may be slightly higher, such that it can be sealed by the cover 100 and thereby form an airtight container. The side surface of the third pot 400 may be in contact with the first heating member 500 to allow the third pot 400 to be heated by the first heating member 500 and thereby conduct pressure cooking. The first pot 200 is also provided with a second heating member 700 at the bottom thereof. Optionally, the second heating member 700, instead of the first heating member 500, may be used for heating during pressure cooking, such that the bottom of the third pot 400 can be heated by the second heating member 700 to obtain the effect of pressure cooking.

If the height of the rotating shaft 702 is equal or lower than the height of the heating plate, the bottom of the third pot 400 may be in contact with the heating plate, and when the third pot 400 is fixed inside the first pot 200, a controller 800 is configured to control the rotary motor 701 not to operate. In such a case, a second motor base provided at the bottom of the third pot 400 may be arranged to protrude from the bottom of the first pot 200, or the third pot 400 may be provided with no second motor base at all. In this way, when a second motor base is provided at the bottom of the third pot 400, the third pot 400 may be fixed inside the first pot 200 by the engagement between the second motor base and the rotating shaft 702, and when no second motor base is provided at the bottom of the third pot 400, the third pot 400 may be fixed through the abutment between the third pot 400 and the cover, or through an engaging buckle provided at an edge of the first pot 200. Moreover, since the height of the rotating shaft 702 is equal to or lower than the height of the heating plate, the bottom of the third pot 400 can be in contact with the heating plate, such that the third pot 400 can be heated by the second heating member 700.

Optionally, the cover 100 may be further provided with an air hole 101 configured to open when the air pressure inside the sealed space formed by the third pot 400 and the cover 100 is greater than a preset value.

In this way, if the pressure inside the third pot 400 becomes greater than the preset value during pressure cooking, the air hole 101 may open to release the pressure and ensure safety.

Optionally, the first pot 200 of the multifunctional appliance may be further provided with a controller 800 on the sidewall thereof. The controller 800 may be coupled with the first heating member 500, the second heating member 700 and the fan motor 602 of the convection member 600, so as to control the operations thereof. If a rotary motor 701 is further provided, the controller 800 may be also coupled with the rotary motor 701, so as to control the operation of the rotary motor 701 and thereby control the rotation of the second pot 300. The controller 800 may be further coupled with the fan motor 602, and when the second pot 300 is fixed inside the first pot 200, the controller 800 may be configured to control the fan motor 602 to operate; when the third pot 400 is fixed inside the first pot 200, the controller 800 may be configured to control the fan motor 602 not to operate.

Specifically, the appliance of the present disclosure may have baking mode and pressure cooking mode. When the appliance is in baking mode, that is, when the second pot 300 is disposed inside the first pot 200, the controller 800 may control the fan motor 602 to start after it receives an instruction input by the user, such that the one or more fan blades 603 may be driven to rotate by the fan motor 602 of the convection member 600 to make the air drawn into the first pot 200. The controller 800 may also control the first heating member 500 to operate, such that the air drawn in may be heated as it flows through the first heating member 500. The heated air may then flow into the second pot 300 through the one or more first grids 201 and second grids 301 and reach the food contained in the second pot 300, thereby the baking mode may be realized. Optionally, the controller 800 may also control the second heating member 700 to start, so as to heat the bottom of the second pot 300, thereby form a stereo baking pattern to heat the food quickly and evenly.

Optionally, the controller 800 may also control the rotary motor 701 to rotate, such that the rotating shaft 702 of the rotary motor 701 may drive the first motor base 302 engaged with it and then cause the rotation of the second pot 300, so as to heat the second pot 300 evenly, and thereby allow the bottom of the second pot 300 to be heated evenly. The rotation direction of the second pot 300 during baking driven by the rotary motor 701 is shown in FIG. 7. As shown in FIG. 8, due to the height of the second pot 300, there may be a clearance 900 formed between the cover 100 and the second pot 300. The water vapor generated during baking may rise and then be quickly discharged from the clearance 900 between the cover 100 and the second pot 300 with the help of the wind force generated by the convection member 600. In this way, better baking effect can be obtained.

When the appliance is in pressure cooking mode, the controller 800 may control the second heating member 700 to operate and control the first heating member 500 not to operate.

Figure 9:
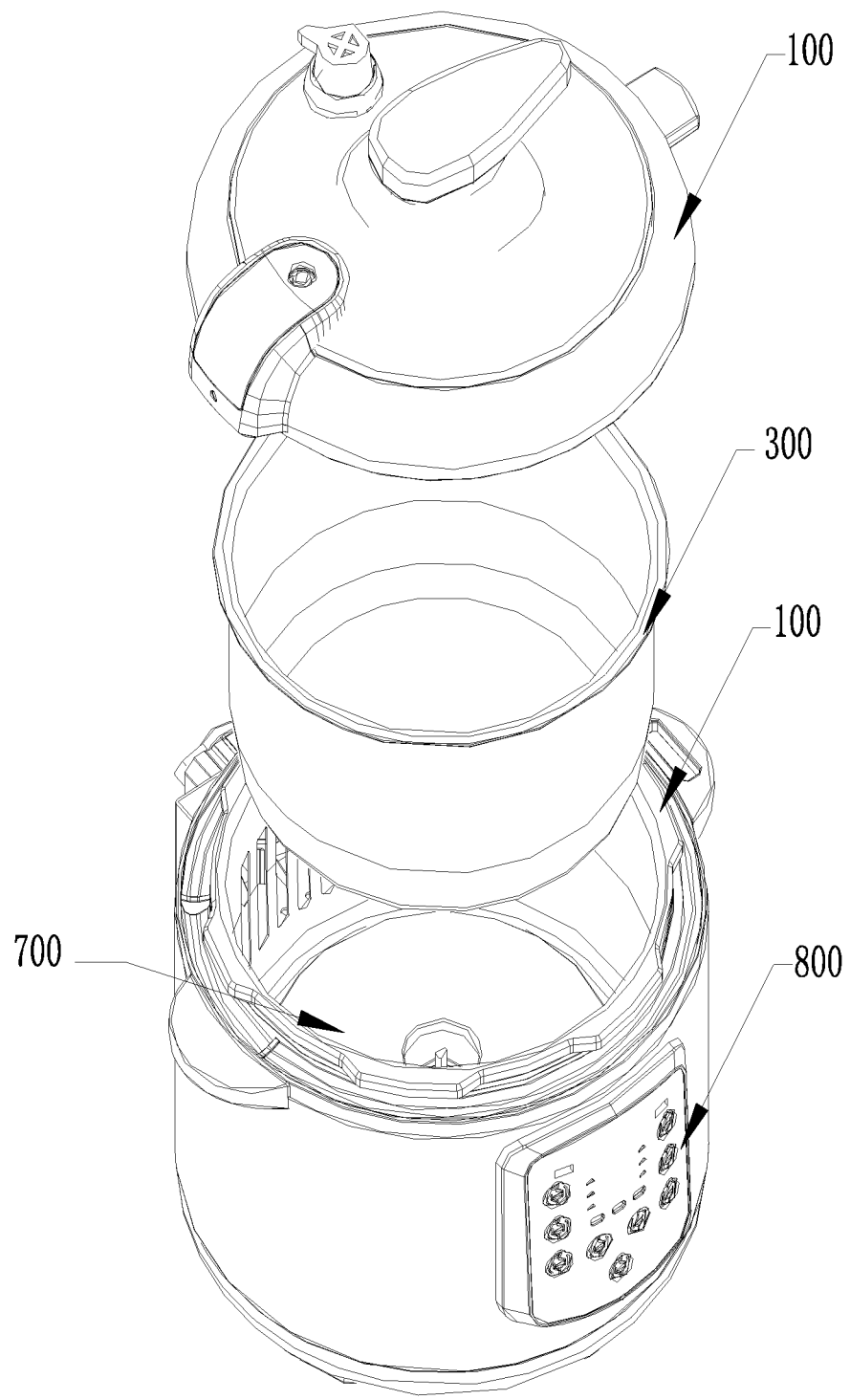
FIG. 9 is an exploded schematic view of the multifunctional appliance in a pressure cooking mode according to another embodiment of the present disclosure.

As shown in FIG. 9, pressure cooking may be conducted with the cooperation of the first pot 200, the third pot 400, the cover 100 and the controller 800.

Figure 11:
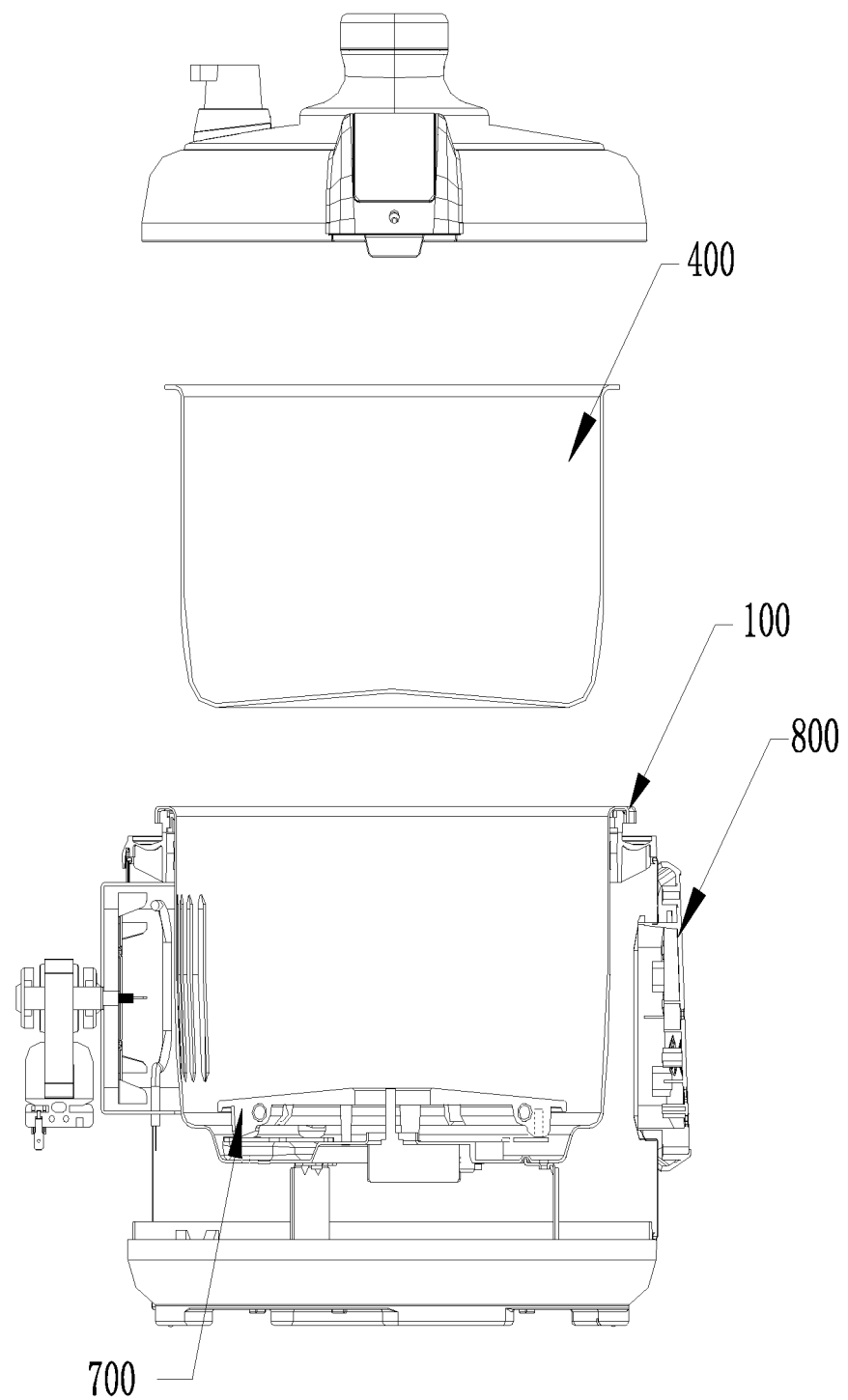
FIG. 11 is a cross-sectional view of the multifunctional appliance according to another embodiment of the present disclosure wherein the third pot is not put into the first pot.
Figure 12:
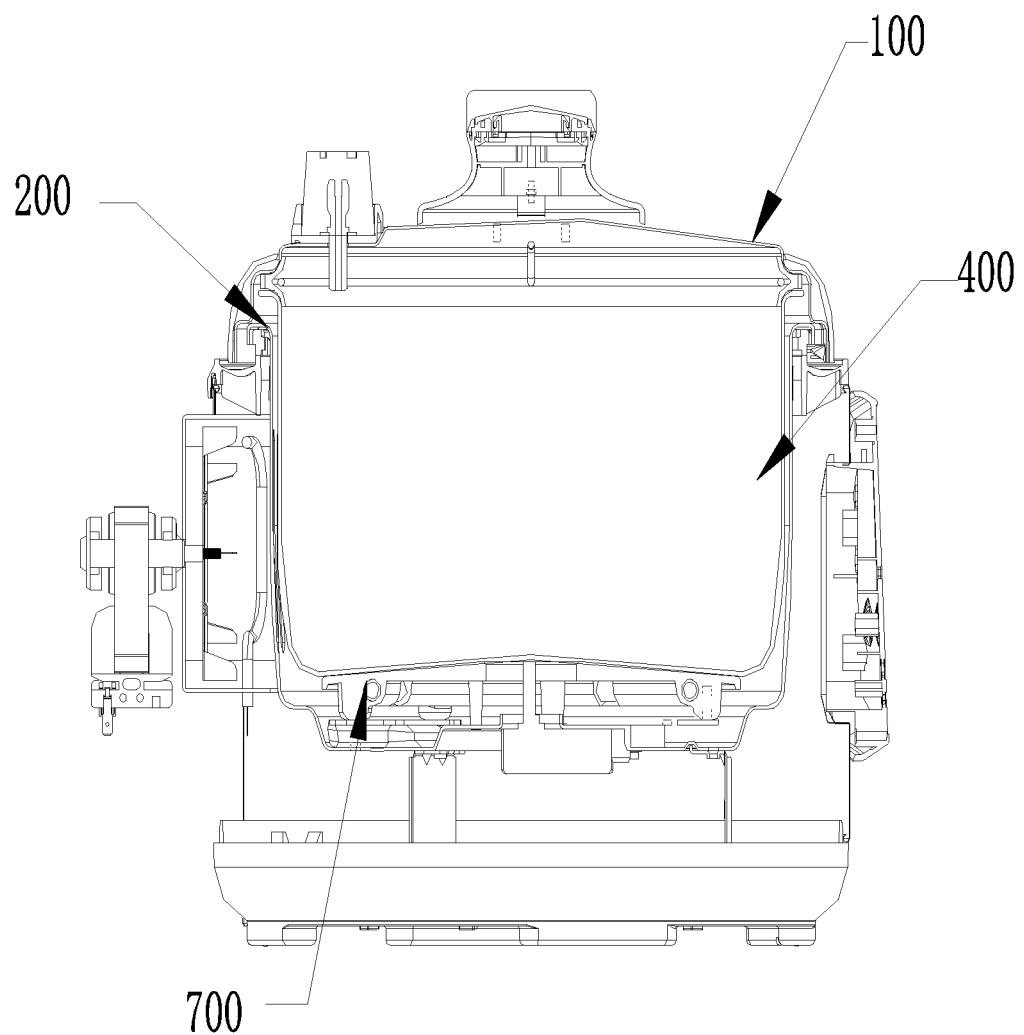
FIG. 12 is a cross-sectional view of the multifunctional appliance according to another embodiment of the present disclosure wherein the third pot is put into the first pot, The numerals are described as follows:
100 cover
101 air hole
200 first pot
201 first grid
300 second pot
301 second grid
302 first motor base
400 third pot
500 first heating member
600 convection member
601 support frame
602 fan motor
603 fan blade
700 second heating member
701 rotary motor
702 rotating shaft
703 motor mounting hole
800 controller
900 clearance

The user may dispose the third pot 400 into the first pot 200 such that the bottom of the third pot 400 is in contact with the second heating member 700, and then put the food to be cooked into the third pot 400 and make the cover 100 fitted onto the first pot 200. The cover 100 and the third pot 400 may form an airtight container, as shown in FIG. 11 and FIG. 12.

The user may then start the second heating member 700 using the controller 800 to start heating. Since an airtight container is formed by the cover 100 and the third pot 400, the heated air continuously expands and generates a certain pressure, thereby realize pressure cooking.

In the present disclosure, the outer pot is provided with one or more grids for ventilation, and is mounted with a fan for convection and with one or more heating tubes on the sidewall thereof, and is further provided with a rotary motor 701 at the bottom thereof, such that both the function of baking with rotary hot air and the function of pressure cooking can be realized with the use of two different kinds of inner pots. Baking process can therefore be conducted more quickly and better.

The technical features in the above embodiments can be combined with each other. For the brevity of the description, not all the possible combinations of the technical features in the above embodiments are described. However, as long as there is no contradiction, the combinations should be considered as within the scope of the disclosure.

The above-mentioned embodiments only illustrate several implementations of the present disclosure. Although the description is specific and detailed, it should not be construed as limiting the scope of the present disclosure. It should be noted that, for a person of ordinary skill in the art, many modifications and improvements can be made without departing from the concept of the present disclosure, which all fall within the scope of the present disclosure. Therefore, the scope of the present disclosure shall be subject to the appended claims.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A multifunctional appliance for cooking comprising:
a cover;
a first pot on which the cover is detachably fitted, the first pot being provided with one or more first grids at a predetermined position thereof, each first grid being vertical or horizontal and having a first shape;
a second pot detachably fixed inside the first pot, the second pot being provided with one or more second grids at a predetermined position thereof, the position of the one or more second grids corresponding with the position of the one or more first grids, each second grid having a second shape in accordance with the first shape of the first grid, wherein the each first grid and the each second grid face toward each other and the height of the second pot is lower than the height of the first pot, such that a clearance is formed between the second pot and the cover when the cover is fitted onto the first pot;
a first heating member fixed on a sidewall of the first pot, facing right toward the one or more first grids wherein the first heating member is configured to heat the second pot disposed inside the first pot during operation, so as to heat the food evenly in the second pot;
a second heating member provided at a bottom of the first pot, the second heating member being configured to heat a bottom of the second pot disposed inside the first pot, wherein the second heating member is a heating plate provided with a motor mounting hole at the center thereof; and the heating plate is fixed at the bottom of the first pot, and wherein the rotary motor is fixed at the bottom of the first pot through the motor mounting hole;
a rotary motor provided at the bottom of the first pot, wherein the rotary motor is coupled with a rotating shaft, and is configured to drive the rotating shaft to rotate; the second pot is also provided with a first motor base at a bottom of the second pot; when the second pot is disposed inside the first pot, the rotating shaft is engaged with the first motor base and is driven to rotate by the rotary motor, and then cause the rotation of the second pot via the first motor base;
a convection member fixed on the sidewall of the first pot, facing right toward the first heating member, such that an airflow generated by the convection member flows through the first heating member first, and subsequently into the second pot through the one or more first grids and the one or more second grids after being heated by the first heating member, so as to heat the food inside the second pot;
a third pot conducting pressure cooking and detachably fixed inside the first pot and the third pot being in contact with the second heating member so as to be heated by the second heating member, wherein when the cover is fitted onto the first pot, the third pot and the cover form a sealed space, and the third pot has a side surface in contact with the first heating member to allow the third pot to be heated by the first heating member, thereby conducting pressure cooking; and
a controller provided on the sidewall of the first pot and coupled with the first heating member; wherein the controller is configured to control the first heating member and the second heating member to operate at the same time, and when the third pot is mounted inside the first pot, the controller is configured to control the second heating member to operate and controls the first heating member not to operate; the controller is further coupled with a fan motor and is configured to control the operation of the fan motor, and when the second pot is mounted inside the first pot, the controller is configured to control the fan motor to operate; and the controller is further coupled with a rotary motor, and when the second pot is fixed inside the first pot, the controller is configured to control the rotary motor to operate, and when the third pot is fixed inside the first pot, the controller is configured to control the rotary motor not to operate;

when the appliance is in baking mode, and when the second pot 300 is disposed inside the first pot, the controller controls the fan motor to start after the controller receives an instruction input by a user, such that the one or more fan blades is driven to rotate by the fan motor of the convection member to make the air drawn into the first pot; the controller controls the first heating member to operate, such that the air drawn in is heated as it flows through the first heating member; the heated air then flows into the second pot through the one or more first grids and second grids and reach the food contained in the second pot, thereby realizing the baking mode; the controller also controls the second heating member to start, so as to heat the bottom of the second pot, thereby forming a stereo baking pattern to heat the food quickly and evenly; and when the appliance is in pressure cooking mode, the controller may control the second heating member to operate and control the first heating member not to operate.

2. The multifunctional appliance for cooking according to claim 1, wherein the convection member comprises:

a support frame fixed to the sidewall of the first pot;

a fan motor fixed to a side of the support frame away from the sidewall of the first pot; and one or more blades fixed to a side of the support frame near the sidewall of the first pot, the one or more blades being coupled with the fan motor, the fan motor being configured to drive the one or more blades;

wherein the first heating member is mounted to the support frame along a periphery of the one or more blades.

3. The multifunctional appliance for cooking according to claim 2, wherein the one or more second grids are arranged evenly or unevenly on the entire sidewall of the second pot, or the one or more second grids are arranged evenly or unevenly on a portion of the sidewall of the second pot.

4. The multifunctional appliance for cooking according to claim 3, wherein the height of the rotating shaft is equal to or lower than the height of the heating plate, and wherein the first motor base is configured to protrude from the bottom of the second pot, and wherein when the second pot is fixed inside the first pot, the first motor base inserts into the motor mounting hole and engages with the rotating shaft.

5. The multifunctional appliance for cooking according to claim 3, wherein the height of the rotating shaft is greater than the height of the heating plate, and wherein the first motor base is configured to recess into the bottom of the second pot, and wherein when the second pot is fixed inside the first pot, the rotating shaft inserts into the first motor base and engages with the first motor base.

6. The multifunctional appliance for cooking according to claim 5, wherein the third pot is in contact with the second heating member so as to be heated by the second heating member.

7. The multifunctional appliance for cooking according to claim 6, wherein the cover is further provided with an air hole configured to open when the air pressure in the sealed space formed by the third pot and the cover is greater than a preset value.

8. The multifunctional appliance for cooking according to claim 7, wherein the controller is further coupled with a rotary motor, and wherein when the second pot is fixed inside the first pot, the controller is configured to control the rotary motor to operate, and when the third pot is fixed inside the first pot, the controller is configured to control the rotary motor not to operate.

9. The multifunctional appliance for cooking according to claim 8, wherein each first grid is horizontal.

10. The multifunctional appliance for cooking according to claim 9, wherein each second grid is horizontal.

* * * * *